United States Patent
Raffa et al.

(10) Patent No.: US 9,147,057 B2
(45) Date of Patent: Sep. 29, 2015

(54) TECHNIQUES FOR DEVICE CONNECTIONS USING TOUCH GESTURES

(75) Inventors: Giuseppe Raffa, Portland, OR (US); Sangita Sharma, Portland, OR (US); Chieh-Yih Wan, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 28 days.

(21) Appl. No.: 13/535,795

(22) Filed: Jun. 28, 2012

(65) Prior Publication Data

US 2014/0006954 A1 Jan. 2, 2014

(51) Int. Cl.
G06F 3/01 (2006.01)
G06F 21/32 (2013.01)
G06F 3/0488 (2013.01)

(52) U.S. Cl.
CPC ............ *G06F 21/32* (2013.01); *G06F 3/04883* (2013.01)

(58) Field of Classification Search
CPC ...... G06F 3/0487; G06F 3/01; G06F 3/04883
USPC ........................................................ 715/733
See application file for complete search history.

(56) References Cited

U.S. PATENT DOCUMENTS

| | | | |
|---|---|---|---|
| 8,224,351 B1 * | 7/2012 | Sushkov et al. | 455/456.1 |
| 8,539,550 B1 * | 9/2013 | Terres et al. | 726/2 |
| 8,730,873 B2 | 5/2014 | Nikula et al. | |
| 2007/0188323 A1 * | 8/2007 | Sinclair et al. | 340/568.1 |
| 2009/0143141 A1 | 6/2009 | Wells et al. | |
| 2009/0265671 A1 | 10/2009 | Sachs et al. | |
| 2010/0082990 A1 * | 4/2010 | Grigorovitch | 713/176 |
| 2010/0332668 A1 | 12/2010 | Shah et al. | |
| 2011/0148915 A1 | 6/2011 | Kim | |
| 2011/0314153 A1 * | 12/2011 | Bathiche et al. | 709/225 |
| 2012/0016641 A1 | 1/2012 | Raffa et al. | |
| 2012/0038550 A1 * | 2/2012 | Lemmey et al. | 345/156 |
| 2012/0254878 A1 | 10/2012 | Nachman et al. | |
| 2012/0323521 A1 | 12/2012 | De Foras et al. | |
| 2013/0165098 A1 * | 6/2013 | Nakazawa et al. | 455/418 |
| 2013/0169550 A1 * | 7/2013 | Gai et al. | 345/173 |

FOREIGN PATENT DOCUMENTS

| | | |
|---|---|---|
| KR | 20090048379 | 11/2009 |
| WO | 2012048442 | 4/2012 |
| WO | 2012068136 | 5/2012 |

OTHER PUBLICATIONS

International Search Report and Written Opinion received for PCT Patent Application No. PCT/US2011/054383, mailed Mar. 27, 2012, 10 pages.
Office Action received for U.S. Appl. No. 13/535,795, mailed Dec. 24, 2013, 51 pages.

(Continued)

*Primary Examiner* — William Bashore
*Assistant Examiner* — Daniel Rodriguez
(74) *Attorney, Agent, or Firm* — Kacvinsky Daisak Bluni PLLC

(57) ABSTRACT

Techniques for device connections using touch gestures are described. A method may comprise receiving a first gesture input at a first electronic device, receiving, at the first electronic device, a second gesture input from a second computing device in proximity to the first computing device, comparing the first gesture input and the second gesture input, and establishing a wireless connection between the first computing device and the second computing device if a similarity of the first gesture input and the second gesture input meets or exceeds a similarity threshold based on the comparing. Other embodiments are described and claimed.

17 Claims, 8 Drawing Sheets

(56) References Cited

OTHER PUBLICATIONS

Office Action received for U.S. Appl. No. 13/536,262, mailed Mar. 21, 2014, 9 pages.

Office Action received for U.S. Appl. No. 13/535,795, mailed Aug. 15, 2014, 52 pages.

Office Action received for U.S. Appl. No. 13/536,262, mailed Aug. 14, 2014, 11 pages.

* cited by examiner

600

```
RECEIVE A FIRST GESTURE INPUT AT A FIRST COMPUTING
DEVICE
602
          |
RECEIVE, AT THE FIRST COMPUTING DEVICE, A SECOND
GESTURE INPUT FROM A SECOND COMPUTING DEVICE IN
PROXIMITY TO THE FIRST COMPUTING DEVICE
604
          |
COMPARE THE FIRST GESTURE INPUT AND THE SECOND
GESTURE INPUT
606
          |
ESTABLISH A WIRELESS CONNECTION BETWEEN THE FIRST
COMPUTING DEVICE AND THE SECOND COMPUTING
DEVICE IF A SIMILARITY OF THE FIRST GESTURE INPUT AND
THE SECOND GESTURE INPUT MEETS OR EXCEEDS A
SIMILARITY THRESHOLD BASED ON THE COMPARISON
608
```

*FIG. 6A*

TECHNIQUES FOR DEVICE CONNECTIONS USING TOUCH GESTURES

BACKGROUND

Trust establishment between electronic and/or computing devices is a fundamental challenge in mainstream computing as the number and type of personal and portable computing form factors continues to increase. In general, trust establishment involves authenticating the identities of users or devices to enable the establishment of communication connections for any number of activities including but not limited to an exchange of personal data between devices, social sharing of media or to create a shared experience between multiple devices. Complex solutions have been employed by skilled individuals in the past, including Wi-Fi Protected Setup and Bluetooth pairing, but these solutions have essentially proven difficult to use, unreliable and prone to security defects. Manageable authentication methods for the general public are essentially missing from the consumer electronic device domain, for instance, for establishing a secure connection between two commonly owned, controlled or collocated devices such as between a smart phone and a tablet computing device, two smart phones, or a laptop and a personal digital assistant (PDA). Thus, as consumer electronic devices, such as mobile computing form factors, have increased in processing power and functionality, a straightforward and effective protocol for securely connecting these devices remains elusive. It is with respect to these and other considerations that the present improvements have been needed.

BRIEF DESCRIPTION OF THE DRAWINGS

FIG. 6A illustrates an embodiment of a first logic flow.

DETAILED DESCRIPTION

Figure 1:
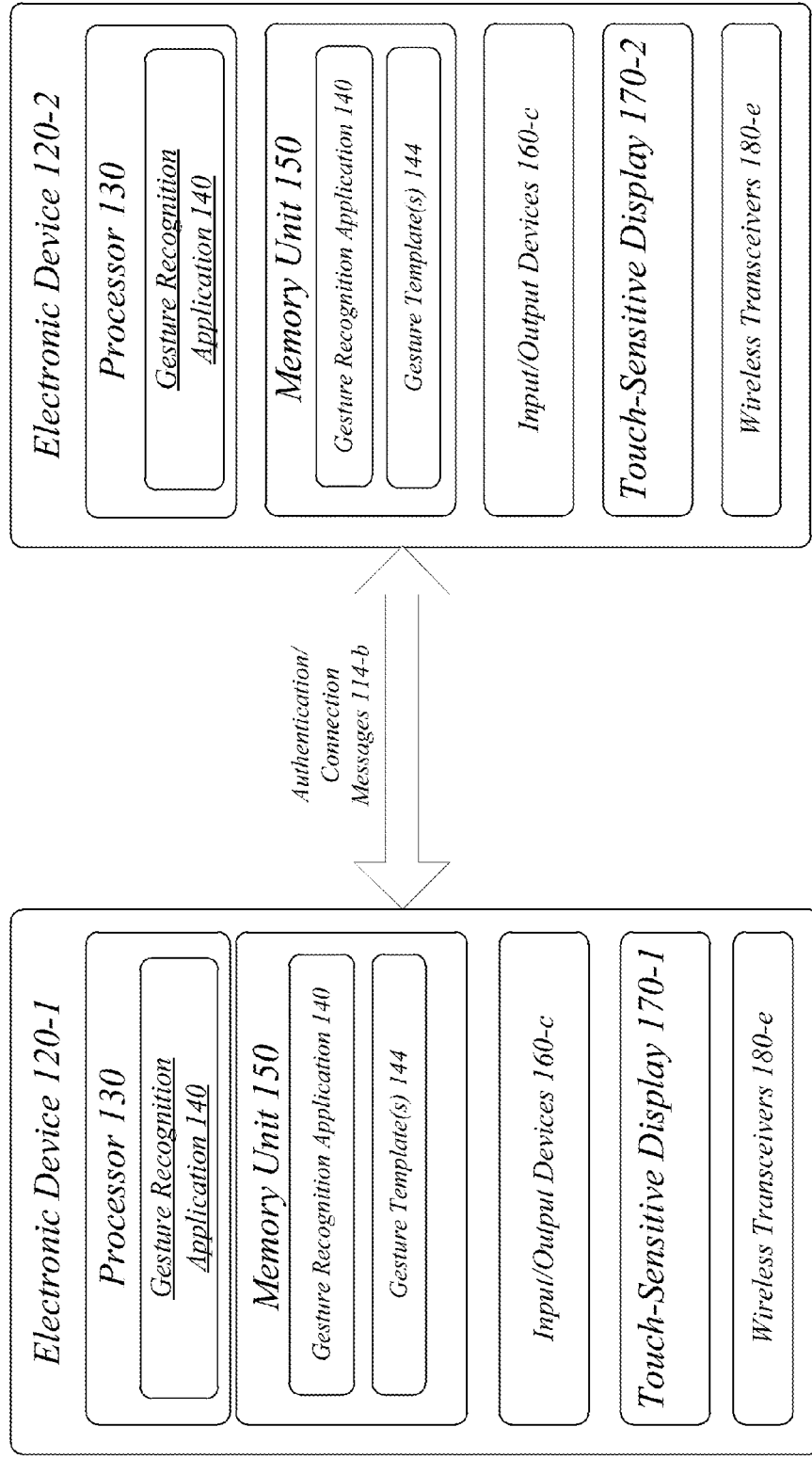
FIG. 1 illustrates an embodiment of a first touch gesture authentication system.

Various embodiments are generally directed to techniques for the authentication of electronic devices. Some embodiments are particularly directed to authentication of proximate electronic devices utilizing touch based gestures entered on two or more proximate electronic devices. The devices may establish a connection utilizing authentication information entered in the form of touch gestures through a touch gesture input device, such as a touch-sensitive display or touch interface. Messages, data, information, access to input/output devices or any other suitable parameter may be exchanged between the devices through the connection, such as through a wireless communication connection. The authentication techniques described herein operate to significantly increase the reliability and simplicity of electronic device authentication, thereby enhancing user productivity, convenience, and experience.

With general reference to notations and nomenclature used herein, the detailed description which follows may be presented in terms of program procedures executed on a computer or network of computers. These procedural descriptions and representations are used by those skilled in the art to most effectively convey the substance of their work to others skilled in the art.

A procedure is here and is generally conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

FIG. 1 illustrates a block diagram for a touch gesture authentication system 100. In one embodiment, the touch gesture authentication system 100 may comprise a computer-based system comprising one or more computing devices or, as referred to hereinafter, electronic device 120-a. The electronic device 120-a may comprise, for example, a processor 130, a memory unit 150, input/output devices 160-c, displays 170-d, and one or more transceivers 180-e. The electronic device 120-a may further have installed or comprise a gesture recognition application 140. The memory unit 150 may store an unexecuted version of the gesture recognition application 140 and one or more gesture templates 144. Although the touch gesture authentication system 100 shown in FIG. 1 has a limited number of elements in a certain topology, it may be appreciated that the touch gesture authentication system 100 may include more or less elements in alternate topologies as desired for a given implementation.

It is worthy to note that "a" and "b" and "c" and similar designators as used herein are intended to be variables representing any positive integer. Thus, for example, if an implementation sets a value for a=5, then a complete set of electronic devices 120-*a* may include electronic devices 120-1, 120-2, 120-3, 120-4 and 120-5. The embodiments are not limited in this context.

In various embodiments, the touch gesture authentication system 100 may comprise two or more electronic devices 120-*a*, such as electronic devices 120-1, 120-2. Some examples of an electronic device may include without limitation an ultra-mobile device, a mobile device, a personal digital assistant (PDA), a mobile computing device, a smart phone, a telephone, a digital telephone, a cellular telephone, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, machine, or combination thereof. The embodiments are not limited in this context, however, several embodiments described herein require that each of a plurality of devices should have or include a touch-enabled user interface or touch-sensitive display and should also have wired or wireless networking capabilities.

In one embodiment, for example, the electronic device 120-1 may be implemented as a desktop computer having wireless communications capabilities. The electronic device 120-2 may be implemented as a mobile device having a portable power supply and wireless communications capabilities, such as a laptop computer, handheld computer, tablet computer, smart phone, gaming device, consumer electronic, or other mobile device. The embodiments are not limited to these examples, however, and any pair of electronic devices 120-1, 120-2 may be used as desired for a given implementation. Further, although the electronic devices 120-1, 120-2 are shown in FIG. 1 as homogeneous devices having the same or similar device elements, it may be appreciated that the electronic devices 120-1, 120-2 may comprise heterogeneous devices having different device elements. The embodiments are not limited in this context.

In various embodiments, one or more devices 120-1, 120-2 of the touch gesture authentication system 100 may comprise a processor 130. The processor 130 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Core (2) Quad®, Core i3®, Core i5®, Core i7®, Atom®, Itanium®, Pentium®, Xeon®, and XScale®processors; and similar processors. Dual microprocessors, multi-core processors, and other multi-processor architectures may also be employed as the processing 130.

In various embodiments, one or more devices 120-1, 120-2 of the touch gesture authentication system 100 may comprise a memory unit 150. The memory unit 150 may store, among other types of information, the gesture recognition application 140 and gesture templates 144. The memory unit 150 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

In various embodiments, the touch gesture authentication system 100 may comprise one or more input/output devices 160-*c*. The one or more input/output devices 160-*c* may be arranged to provide functionality to the electronic device 120-*a* including but not limited to capturing images, exchanging information, capturing or reproducing multimedia information, determining a location of the electronic device 120-*a* or any other suitable functionality. Non-limiting examples of input/output devices 160-*c* include a camera, QR reader/writer, bar code reader, and a display 170-*d* coupled with an electronic device 120-*a*. The embodiments are not limited in this respect.

The electronic devices 120-1, 120-2 may each implement a display 170-*d* in some embodiments. The display 170-*d* may comprise any digital display device suitable for the electronic devices 120-1, 120-2. For instance, the displays 170-*d* may be implemented by a liquid crystal display (LCD) such as a touch-sensitive, color, thin-film transistor (TFT) LCD, a plasma display, a light emitting diode (LED) display, an organic light emitting diode (OLED) display, a cathode ray tube (CRT) display, or other type of suitable visual interface for displaying content to a user of the electronic devices 120-1, 120-2. The displays 170-*d* may further include some form of a backlight or brightness emitter as desired for a given implementation.

In various embodiments, the display 170-*d* may comprise touch-sensitive or touchscreen display. A touchscreen may comprise an electronic visual display that is operative to detect the presence and location of a touch within the display area or touch interface. In some embodiments, the display may be sensitive or responsive to touching of the display of the device with a finger or hand. In other embodiments, the display may be operative to sense other passive objects, such as a stylus or electronic pen. In various embodiments, display 170-*d* may enable a user to interact directly with what is displayed, rather than indirectly with a pointer controlled by a mouse or touchpad. Other embodiments are described and claimed.

The electronic devices 120-1, 120-2 may each implement one or more wireless transceivers 180-*e*. Each of the wireless transceivers 180-*e* may be implemented as physical wireless adapters or virtual wireless adapters sometimes referred to as "hardware radios" and "software radios." In the latter case, a single physical wireless adapter may be virtualized using software into multiple virtual wireless adapters. A physical wireless adapter typically connects to a hardware-based wireless access point. A virtual wireless adapter typically connects to a software-based wireless access point, sometimes referred to as a "SoftAP." For instance, a virtual wireless adapter may allow ad hoc communications between peer devices, such as a smart phone and a desktop computer or notebook computer. Various embodiments may use a single physical wireless adapter implemented as multiple virtual wireless adapters, multiple physical wireless adapters, multiple physical wireless adapters each implemented as multiple virtual wireless adapters, or some combination thereof. The embodiments are not limited in this case.

The wireless transceivers 180-e may comprise or implement various communication techniques to allow the electronic devices 120-1, 120-2 to communicate with other electronic devices. For instance, the wireless transceivers 180-e may implement various types of standard communication elements designed to be interoperable with a network, such as one or more communications interfaces, network interfaces, network interface cards (NIC), radios, wireless transmitters/receivers (transceivers), wired and/or wireless communication media, physical connectors, and so forth. By way of example, and not limitation, communication media includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

In various embodiments, the electronic devices 120-a may implement different types of wireless transceivers 180-e. Each of the wireless transceivers 180-e may implement or utilize a same or different set of communication parameters to communicate information between various electronic devices. In one embodiment, for example, each of the wireless transceivers 180-e may implement or utilize a different set of communication parameters to communicate information between the electronic device 120-a and a remote device. Some examples of communication parameters may include without limitation a communication protocol, a communication standard, a radio-frequency (RF) band, a radio, a transmitter/receiver (transceiver), a radio processor, a baseband processor, a network scanning threshold parameter, a radio-frequency channel parameter, an access point parameter, a rate selection parameter, a frame size parameter, an aggregation size parameter, a packet retry limit parameter, a protocol parameter, a radio parameter, modulation and coding scheme (MCS), acknowledgement parameter, media access control (MAC) layer parameter, physical (PHY) layer parameter, and any other communication parameters affecting operations for the wireless transceivers 180-e. The embodiments are not limited in this context.

In various embodiments, the wireless transceivers 180-e may implement different communication parameters offering varying bandwidths, communications speeds, or transmission range. For instance, a first wireless transceiver 180-1 may comprise a short-range interface implementing suitable communication parameters for shorter range communications of information, while a second wireless transceiver 180-2 may comprise a long-range interface implementing suitable communication parameters for longer range communications of information.

In various embodiments, the terms "short-range" and "long-range" may be relative terms referring to associated communications ranges (or distances) for associated wireless transceivers 180-e as compared to each other rather than an objective standard. In one embodiment, for example, the term "short-range" may refer to a communications range or distance for the first wireless transceiver 180-1 that is shorter than a communications range or distance for another wireless transceiver 180-e implemented for the electronic device 120-a, such as a second wireless transceiver 180-2. Similarly, the term "long-range" may refer to a communications range or distance for the second wireless transceiver 180-2 that is longer than a communications range or distance for another wireless transceiver 180-e implemented for the electronic device 120-a, such as the first wireless transceiver 180-1. The embodiments are not limited in this context.

In various embodiments, the terms "short-range" and "long-range" may be relative terms referring to associated communications ranges (or distances) for associated wireless transceivers 180-e as compared to an objective measure, such as provided by a communications standard, protocol or interface. In one embodiment, for example, the term "short-range" may refer to a communications range or distance for the first wireless transceiver 180-1 that is shorter than 300 meters or some other defined distance. Similarly, the term "long-range" may refer to a communications range or distance for the second wireless transceiver 180-2 that is longer than 300 meters or some other defined distance. The embodiments are not limited in this context.

In one embodiment, for example, the wireless transceiver 180-1 may comprise a radio designed to communicate information over a wireless personal area network (WPAN) or a wireless local area network (WLAN). The wireless transceiver 180-1 may be arranged to provide data communications functionality in accordance with different types of lower range wireless network systems or protocols. Examples of suitable WPAN systems offering lower range data communication services may include a Bluetooth system as defined by the Bluetooth Special Interest Group, an infra-red (IR) system, an Institute of Electrical and Electronics Engineers (IEEE) 802.15 system, a DASH7 system, wireless universal serial bus (USB), wireless high-definition (HD), an ultra-side band (UWB) system, and similar systems. Examples of suitable WLAN systems offering lower range data communications services may include the IEEE 802.xx series of protocols, such as the IEEE 802.11a/b/g/n series of standard protocols and variants (also referred to as "WiFi"). It may be appreciated that other wireless techniques may be implemented, and the embodiments are not limited in this context.

In one embodiment, for example, the wireless transceiver 180-2 may comprise a radio designed to communicate information over a wireless local area network (WLAN), a wireless metropolitan area network (WMAN), a wireless wide area network (WWAN), or a cellular radiotelephone system. The wireless transceiver 180-2 may be arranged to provide data communications functionality in accordance with different types of longer range wireless network systems or protocols. Examples of suitable wireless network systems offering longer range data communication services may include the IEEE 802.xx series of protocols, such as the IEEE 802.11a/b/g/n series of standard protocols and variants, the IEEE 802.16 series of standard protocols and variants, the IEEE 802.20 series of standard protocols and variants (also referred to as "Mobile Broadband Wireless Access"), and so forth. Alternatively, the wireless transceiver 180-2 may comprise a radio designed to communication information across data networking links provided by one or more cellular radiotelephone systems. Examples of cellular radiotelephone systems offering data communications services may include GSM with General Packet Radio Service (GPRS) systems (GSM/GPRS), CDMA/1xRTT systems, Enhanced Data Rates for Global Evolution (EDGE) systems, Evolution Data Only or Evolution Data Optimized (EV-DO) systems, Evolution For Data and Voice (EV-DV) systems, High Speed Downlink Packet Access (HSDPA) systems, High Speed Uplink Packet Access (HSUPA), and similar systems. It may be appreciated that other wireless techniques may be implemented, and the embodiments are not limited in this context.

Although not shown, the electronic device 120-*a* may further comprise one or more device resources commonly implemented for electronic devices, such as various computing and communications platform hardware and software components typically implemented by a personal electronic device. Some examples of device resources may include without limitation a co-processor, a graphics processing unit (GPU), a chipset/platform control hub (PCH), an input/output (I/O) device, computer-readable media, display electronics, display backlight, network interfaces, location devices (e.g., a GPS receiver), sensors (e.g., biometric, thermal, environmental, proximity, accelerometers, barometric, pressure, etc.), portable power supplies (e.g., a battery), application programs, system programs, and so forth. Other examples of device resources are described with reference to exemplary computing architectures shown by FIG. 7. The embodiments, however, are not limited to these examples.

In the illustrated embodiment shown in FIG. 1, the processor 130 may be communicatively coupled to the wireless transceivers 180-*e* and the memory unit 150. The memory unit 150 may store a gesture recognition application 140 arranged for execution by the processor 130 to authenticate electronic devices 120-*a*. The gesture recognition application 140 may generally provide features to securely authenticate electronic devices 120-*a* in proximity to each other utilizing personalized touch gestures entered via one or more touch interfaces of the respective electronic devices 120-*a*. More particularly, the gesture recognition application 140 may allow a user of electronic devices 120-*a* to rapidly establish a secure connection between two or more devices 120-*a* using personalized touch gestures.

In various embodiments, it may be desirable to establish a connection between devices 120-*a*. For example, devices 120-*a* may be located in proximity to one another, may be controlled or owned by the same user and/or may be connected to the same wireless network. A secure connection that can be easily established between the devices 120-*a* may allow for the sharing of information or data between devices 120-*a* and/or may allow for the sharing of resources (e.g. displays, peripherals, etc.) between devices 120-*a*. These and other advantageous can be realized based on the implementation of an easy-to-use mechanism to authenticate the same user on the devices 120-*a* and subsequently establishing a connection between the devices 120-*a*.

The gesture recognition application 140 of electronic device 120-1 may be operative on the processor 130 to detect that electronic device 120-2 is proximate to the electronic device 120-1. For example, the detecting may comprise one or more of determining that the electronic device 120-1 and the electronic device 120-2 are connected to a same wireless network. In other embodiments, audio signals may be used by electronic device 120-1 and the electronic device 120-2 to determine a distance between the electronic devices 120-*a*. In still other embodiments, radio frequency signals may be used to determine a distance between the electronic devices 120-*a*. It should be understood that any known proximity or location (e.g. global positioning system, cellular triangulation, etc.) detection method or technique could be used and still fall within the described embodiments.

In some embodiments, responsive to determining that the electronic devices 120-*a* are in proximity to one another, gesture recognition application 140 may be initiated or launched. For example, upon detection of a close proximity, gesture recognition application 140 may be automatically launched and may be operative to display one or more graphical user interface (GUI) elements requesting entry of a personalized touch gesture. In other embodiments, the gesture recognition application 140 may be manually launched by a user of any of electronic devices 120-*a* to initiate the touch gesture authentication system 100. The embodiments are not limited in this respect.

The gesture recognition application 140 may be operative, as part of touch gesture authentication system 100, to generate a prompt on each electronic device 120-*a* requesting entry of a gesture input by a user. The gesture inputs may comprise one or more of a shape, letter, number, or symbol entered using a touch-screen display 170-1, 170-2 in some embodiments. For example, the gesture inputs may comprise a shape, letter, number, or symbol drawn on the touch-screen display 170-1 using a finger or stylus. In other embodiments, the gesture inputs may comprise multi-touch gesture inputs. Other embodiments are described and claimed.

In various embodiments, the gesture recognition application 140 may be operative on the processor 130 to receive a first gesture input entered via the touch-screen display 170-1 of electronic device 120-1. A second gesture input may be entered via the touch-screen display 170-2 of electronic device 120-2 that is in proximity to electronic device 120-1 and gesture recognition application 140 of electronic device 120-2 may be operative to send the second gesture input to the gesture recognition application 140 of electronic device 120-1. Electronic device 120-1 may receive both the first and second gesture inputs and may utilize gesture recognition application 140 or any other suitable logic to analyze and/or compare the gestures. In some embodiments more than one gesture input may be entered or received on two or more electronic devices, such as both of electronic devices 120-1 and 120-2. In these embodiments, the two "touched" electronic devices may be operative to broadcast to all electronic devices within defined proximity, such as within a same subnet, to determine if any other devices have received a gesture input. In these embodiments, only the two (or more) electronic devices that were used by the user (e.g. received a gesture input) would have all of the gesture input authentication information to be operative to perform a comparison of the gesture inputs and to form a connection based on the gesture inputs.

The exchange of gestures and other information, messages and/or data is shown in FIG. 1 as authentication/connection messages 114-*b*. The authentication/connection messages 114-*b* may comprise, in addition to the received gesture inputs used for authentication, information necessary for establishing a wireless connection between the devices 120-1 and 120-2 including but not limited to device identification information. Other embodiments are described and claimed.

In some embodiments, gesture recognition application 140 may be operative to compare the first gesture input and the second gesture input. In various embodiments, comparison of the first gesture input and the second gesture input may be used to determine if a successful authentication operation has been completed which may result in the establishment of a wireless connection between electronic device 120-1 and electronic device 120-2. For example, if a similarity of the first gesture input and the second gesture input meets or exceeds a similarity threshold (which may be predetermined), a wireless connection may be established between the electronic device 120-1 and the electronic device 120-2. The similarity may be based on any number of factors including but not limited to a sequence of raw data points associated with the gestures, special geometric features of the gestures, the manner, timing or direction in which the gestures are created or any other suitable factor.

In other embodiments, two or more different gestures may be predetermined to be linked together (e.g. as a set) for authentication purposes. For example, a first gesture input may be entered at electronic device 120-1 and a second, different gesture input may be entered at electronic device 120-2. While different, in some embodiments one or more of electronic devices 120-1 or 120-2 may be aware that when presented together, these different gesture inputs are sufficient to establish a connection as described elsewhere herein. In some embodiments, the use of different gestures with a predetermined pairing or linking may enhance the connection security for the electronic devices 120-1 and 120-2 by preventing a bystander from seeing and attempting to copy a gesture input used on one electronic device to try to establish an unauthorized connection with their own or any other device. By using different gestures, both gestures needed for authentication would need to be known by the bystander to establish a connection. Other embodiments are described and claimed.

The comparing of the first and second gesture inputs may ensure that a same user is authorizing both electronic devices 120-1 and 120-2. For example, different users may be unable to replicate, with sufficient similarity, a personalized gesture input or may not be aware of the linked or paired different gestures used for authentication. By way of contrast, a password or other conventional authentication mechanism may be easily entered on electronic devices 120-1 and 120-2 to establish a connection. Use of a personalized and/or user selected gesture input may provide a level of personalization to the authentication process while enabling an easy way to establish a secure connection for multi-device usage scenarios. In some embodiments, the gesture inputs described herein may be used as the only form of authentication information. In other embodiments, the gesture inputs may be used in combination with other forms of authentication such as a passcode or passphrase. For example, a password may be entered along with a gesture input and the two may be linked together such that the combination of authentication inputs can be used. Other embodiments are described and claimed.

While described above with reference to a comparison of the first gesture input to a second gesture input, the gesture recognition application 140 may be operative on the processor to initiate a gesture recognition training phase in some embodiments to generate and store one or more gesture templates for use in future comparison and authentication operations. For example, the gesture recognition application 140 may be operative to generate a prompt requesting entry of a training gesture input, the training gesture input may be received, and a request for reentry of the training gesture input may be generated (one or more times) to ensure that the training gesture is entered correctly and is repeatable. The training gesture input may be stored as a gesture template in the memory unit 150.

In various embodiments, the gesture recognition application 140 may be operative on the processor 130 to compare the first gesture input and/or the second gesture input to the gesture template and to calculate a similarity confidence score based on the comparison. The gesture recognition application 140 may also be operative to establish the connection between the devices 120-1 and 120-2 if the similarity confidence score meets or exceeds the similarity threshold. The generation and saving of gesture templates may allow the system to more precisely define gesture inputs. The use of gesture templates may also allow the gesture recognition application 140 to associate different gesture inputs with different users, to associate different types of connections or different levels of security access with different gestures, or to associate different sharing modes with different gestures. For example, one gesture could be defined or assigned to establish a connection and open a media sharing application whereas another gesture could be defined or assigned to establish a connection and open a file manager. In other embodiments, different gestures could be assigned to different family members with access to the same devices, allowing for variable permissions based on the gesture inputs. The use of a plurality of gesture inputs may provide additional personalization based on user preferences and device functionality. The embodiments are not limited in this respect.

Figure 2:
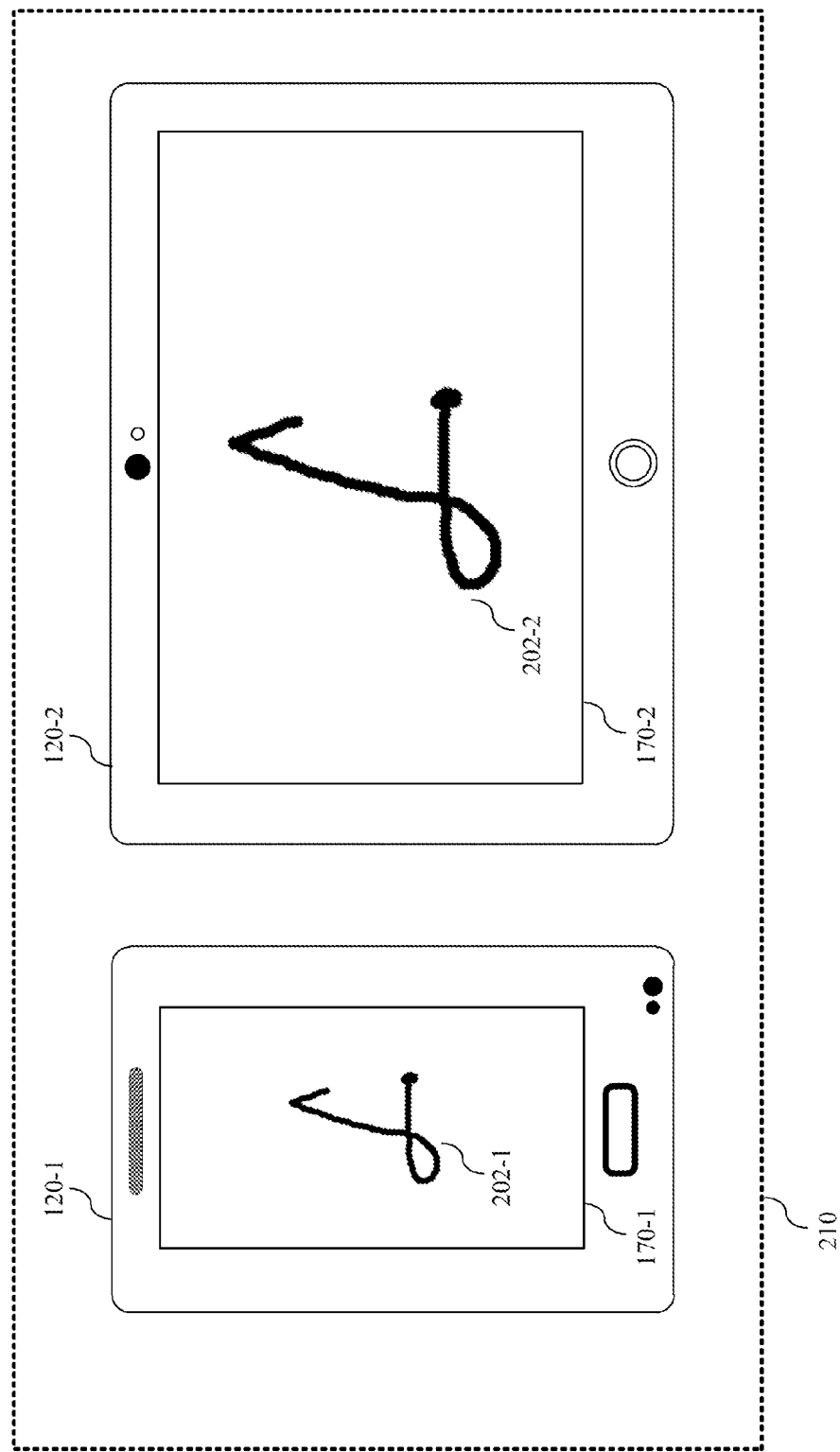
FIG. 2 illustrates an embodiment of an operating environment.

FIG. 2 illustrates an embodiment of an operating environment 200 for the touch gesture authentication system 100. More particularly, the operating environment 200 may illustrate the presentation or generation of gesture inputs 202-1 and 202-2 on the touch interfaces, touchscreens and/or touch-sensitive displays 170-1 and 170-2 of electronic devices 120-1 and 120-2 respectively.

In the illustrated embodiment shown in FIG. 2, a first gesture input 202-1 may be entered via the touch interface 170-1 of electronic device 120-1 and a second gesture input 202-2 may be entered via the touch interface 170-2 of electronic device 120-2. While different in size and orientation on the respective touch interfaces 170-1 and 170-2 (e.g. due to a difference in size of the interfaces 170-1 and 170-2 or the difference in scale or size of the devices 120-1 and 120-2 for example), it can be seen in the FIG. 2 that the gesture inputs 202-1 and 202-2 are substantially similar in their shape, geometry and style. This similarity may be sufficient to enable authentication of a user of the devices 120-1 and 120-2 and to establish a wireless connection between the devices 120-1 and 120-2. While shown having a particular shape and arrangement in FIG. 2, it should be understood that any suitable gesture input could be used and still fall within the described embodiments.

In various embodiments, limitations may be placed on the complexity (or lack of complexity) of the gesture inputs. For example, a straight line may not be accepted as a gesture input due to a lack of complexity and an associated lack of personalization and security. By way of contrast, an over-complex gesture input may also be rejected based on a possible inability to adequately and repeatedly replicate the gesture input. In some embodiments, the limitations on gesture inputs may be defined or enforced during the above-described training phase. Other embodiments are described and claimed.

Figure 3:
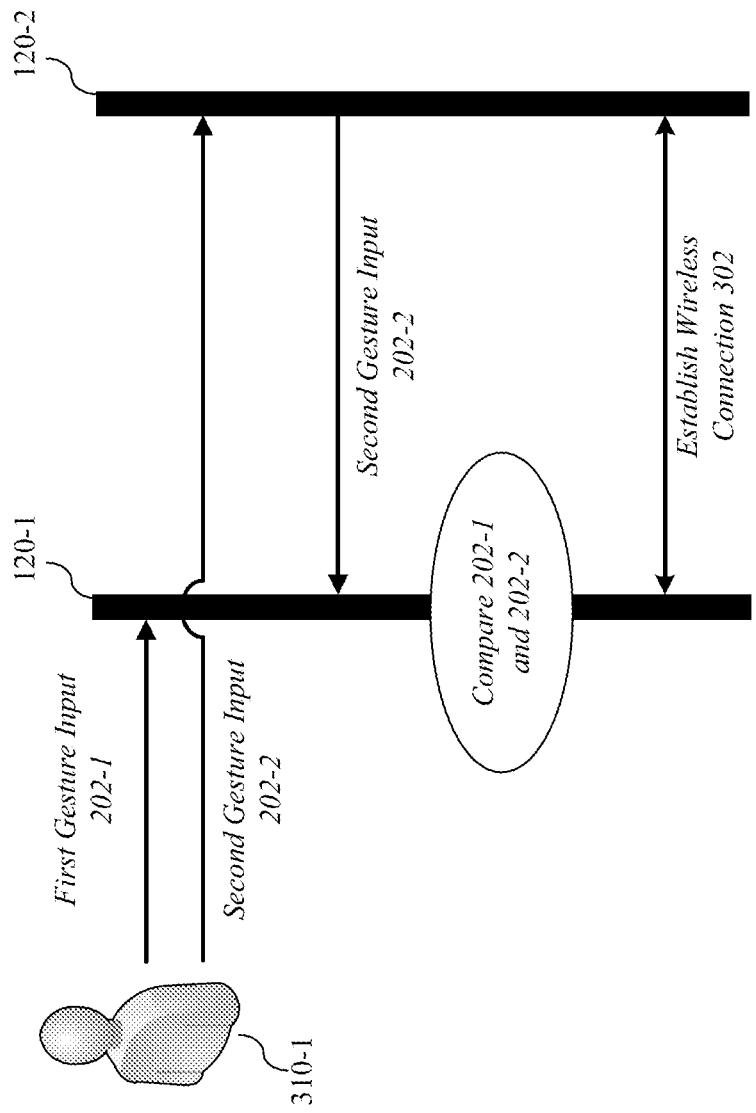
FIG. 3 illustrates an embodiment of a first information flow.

FIG. 3 illustrates an embodiment of an information flow 300. The information flow 300 as shown in FIG. 3 represents an exemplary flow of information between a user 310-1 and electronic devices 120-1 and 120-2. A limited number of information elements are shown in FIG. 3 for purposes of illustration and not limitation. As such, more or less information elements could be used and still fall within the described embodiments.

As shown in FIG. 3, electronic devices 120-1 and 120-2 may be in proximity to one another and may be controlled, owned or otherwise accessible to user 310-1. In some embodiments, a first gesture input 202-1 may be received by electronic device 120-1. For example, user 310-1 may enter the first gesture input 202-1 via a touch interface of electronic device 120-1. In various embodiments, a second gesture input 202-2 may be received by the electronic device 120-2 and the second gesture input 202-2 may be provided from the electronic device 120-2 to the electronic device 120-1. For example, the user may enter the second gesture input 202-2 via a touch interface of the electronic device 120-2 and the electronic device 120-2 may provide the second gesture input 202-2 to the electronic device 120-1 as part of a gesture authentication system or operation that is automatically initiated based on the proximity (or any other suitable parameter) of the devices 120-1 and 120-2 or manually initiated by the user 310-1. For example, the second gesture input 202-2 may be provided from the second electronic device 120-2 to the first electronic device 120-1 using on a temporary, unsecured connection used for purposes of exchanging authentication information. In other embodiments, the gesture input templates may be stored locally at each device (e.g. at both electronic device 120-1 and 120-2) and the comparison of the gesture inputs 202-1 and 202-2 may be performed locally at each device and the authentication may proceed according to the local comparison. Other embodiments are described and claimed.

In some embodiments, the electronic device 120-1 may be operative to compare the gesture inputs 202-1 and 202-2 or to compare the gesture inputs 202-1 and 202-2 to a gesture input template if available. If, based on the comparison, the electronic device 120-1 determines that the gesture inputs 202-1 and 202-2 are sufficiently similar (e.g. based on a similarity threshold), the electronic device may initiate the establishment of a wireless connection 302 between the electronic devices 120-1 and 120-2. It should be understood that while the comparison of the gesture inputs 202-1 and 202-2 occurs at the electronic device 120-1 in FIG. 3 for purposes of illustration, the comparison may take place at any suitable location within the system such as at electronic device 120-2 or at both electronic devices 120-1 and 120-2. The embodiments are not limited in this respect.

Particular aspects, embodiments and alternatives of the touch gesture authentication system 100 and the gesture recognition application 140 may be further described with reference to FIG. 4. More particularly, while FIGS. 1-3 illustrate and describe the touch gesture authentication system 100 implemented using a distributed or peer-to-peer (P2P) approach where each device 120-*a* is capable of and/or responsible for performing the gesture recognition processing to establish a wireless connection, some embodiments may include a centralized approach to performing gesture recognition and processing as shown and described with reference to FIGS. 4-5. Moreover, while described herein as requiring electronic devices 120-*a* to be in proximity to one another for the touch gesture authentication systems 100, 400, it should be understood that some embodiments are contemplated that involve the electronic devices 120-*a* not being in proximity to one another. Other embodiments are described and claimed.

Figure 4:
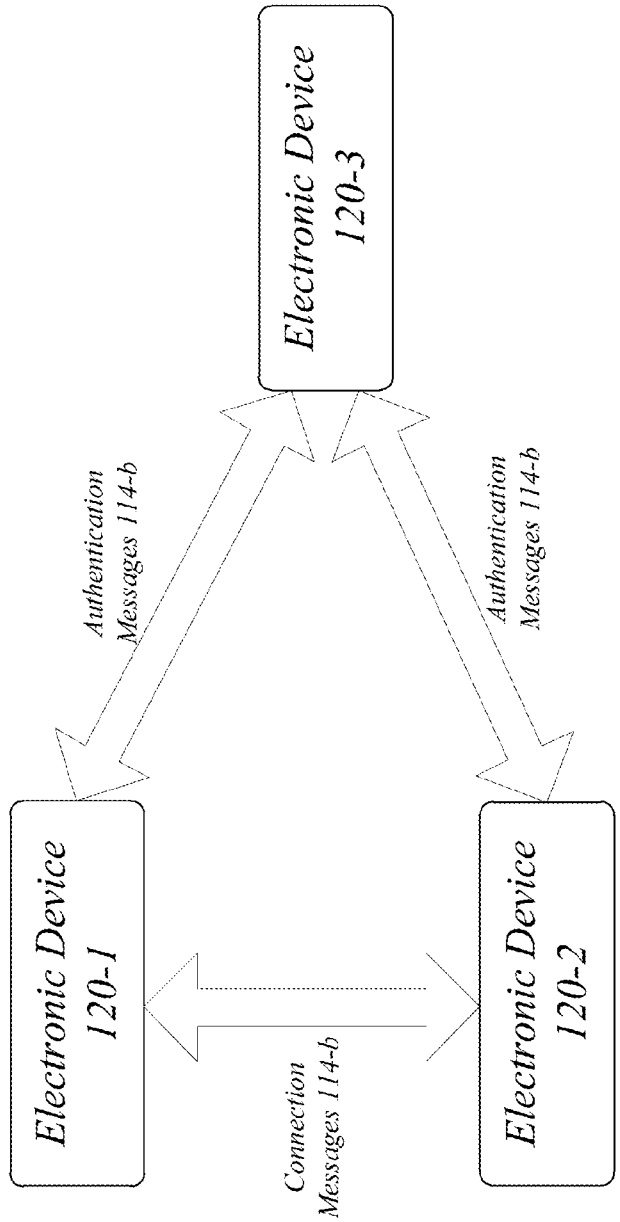
FIG. 4 illustrates an embodiment of a second touch gesture authentication system.

FIG. 4 illustrates a block diagram for a touch gesture authentication system 400. In one embodiment, the touch gesture authentication system 400 may comprise a computer-based system comprising one or more computing devices or, as referred to hereinafter, electronic devices 120-*a* that may be the same or similar to electronic devices 120-*a* of FIG. 1.

As described above, FIG. 4 may represent a centralized system based on the introduction or use of electronic device 120-3. Stated differently, in the touch gesture authentication system 400, establishing a connection between electronic devices 120-1 and 120-2 using personalized touch gestures may include communicating authentication messages 114-*b* (e.g. gesture inputs) and other information through a centralized server or intermediary electronic device 120-3 that is responsible for comparing the gesture inputs and authenticating the connection rather than communicating directly back and forth between devices 120-1 and 120-2 to authenticate the devices as described with respect to FIG. 1.

While not shown in FIG. 4, the electronic devices 120-1 and 120-2 may comprise or include the same or similar components to the electronic devices 120-1 and 120-2 of FIG. 1. In some embodiments, the electronic device 120-3 may also include the same or similar components to the electronic devices 120-1 and 120-2 of FIG. 1. In other embodiments, the electronic device 120-3 may comprise a server, router, bridge, gateway or other electronic device. In various embodiments, while shown and described as being in proximity to electronic devices 120-1 and 120-2, electronic device 120-3 may comprise a remote device. For example, electronic device 120-3 may comprise a server device accessible via the Internet or a cloud-based device. Other embodiments are described and claimed.

In various embodiments, a gesture recognition application operative on a processor of electronic device 120-3 may be operative to receive a first gesture input from a first electronic device 120-1 and to receive a second gesture input from a second electronic device 120-2. As shown in FIG. 4, this information may comprise authentication messages 114-*b*. In some embodiments, the gesture recognition application may be operative to compare the first gesture input and the second gesture input and to establish, authorize, initiate or otherwise enable a wireless connection between the first electronic device 120-1 and the second electronic device 120-2 if a similarity of the first gesture input and the second gesture input meets or exceeds a similarity threshold based on the comparing.

In some embodiments a user may enter a first gesture input via a touch interface of electronic device 120-1 and may also enter a second gesture input via a touch interface of electronic device 120-2. The electronic devices 120-1 and 120-2 may be operative to forward the gesture inputs (e.g. authentication messages 114-*b*) to electronic device 120-3 for further processing (e.g. comparing, etc.). Responsive to determining that the gesture inputs are sufficiently similar, electronic device 120-3 may provide authentication information to one or more of electronic devices 120-1 and 120-2 to inform them of the authentication. In various embodiments, the authentication information may also comprise or include information used for establishing the wireless connection to enable the exchange of connection messages 114-*b* between electronic devices 120-1 and 120-2.

The gesture recognition application of electronic device 120-3 may be operative to determine that the first electronic device 120-1 is proximate to the second electronic device 120-2 in some embodiments. For example, the proximity may be established by determining that the first 120-1 and second 120-2 electronic devices are connected to a same wireless network, by using audio signals to determine a distance between the first 120-1 and second 120-2 electronic devices or by using radio frequency signals to determine a distance between the first 120-1 and second 120-2 electronic devices and to initiate gesture recognition based on the determining.

In various embodiments, the gesture recognition application of electronic device 120-3 may be operative to initiate or control a gesture recognition training phase. In the gesture recognition training phase, a training gesture input may be received from one or more of the electronic devices 120-1 or 120-2, reentry of the training gesture inputs may be requested, and the training gesture input may be stored as a gesture template at one or more memory units or storages of electronic device 120-3 to assist with future authentications. For example, authentication operations may include comparing, at the electronic device 120-3, a first gesture input received from electronic device 120-1 and a second gesture input receiving from electronic device 120-2 to the gesture template. Based on the comparison, a similarity confidence score may be generated and the connection may be established if the similarity confidence score meets or exceeds the similarity threshold. Other embodiments are described and claimed.

Figure 5:
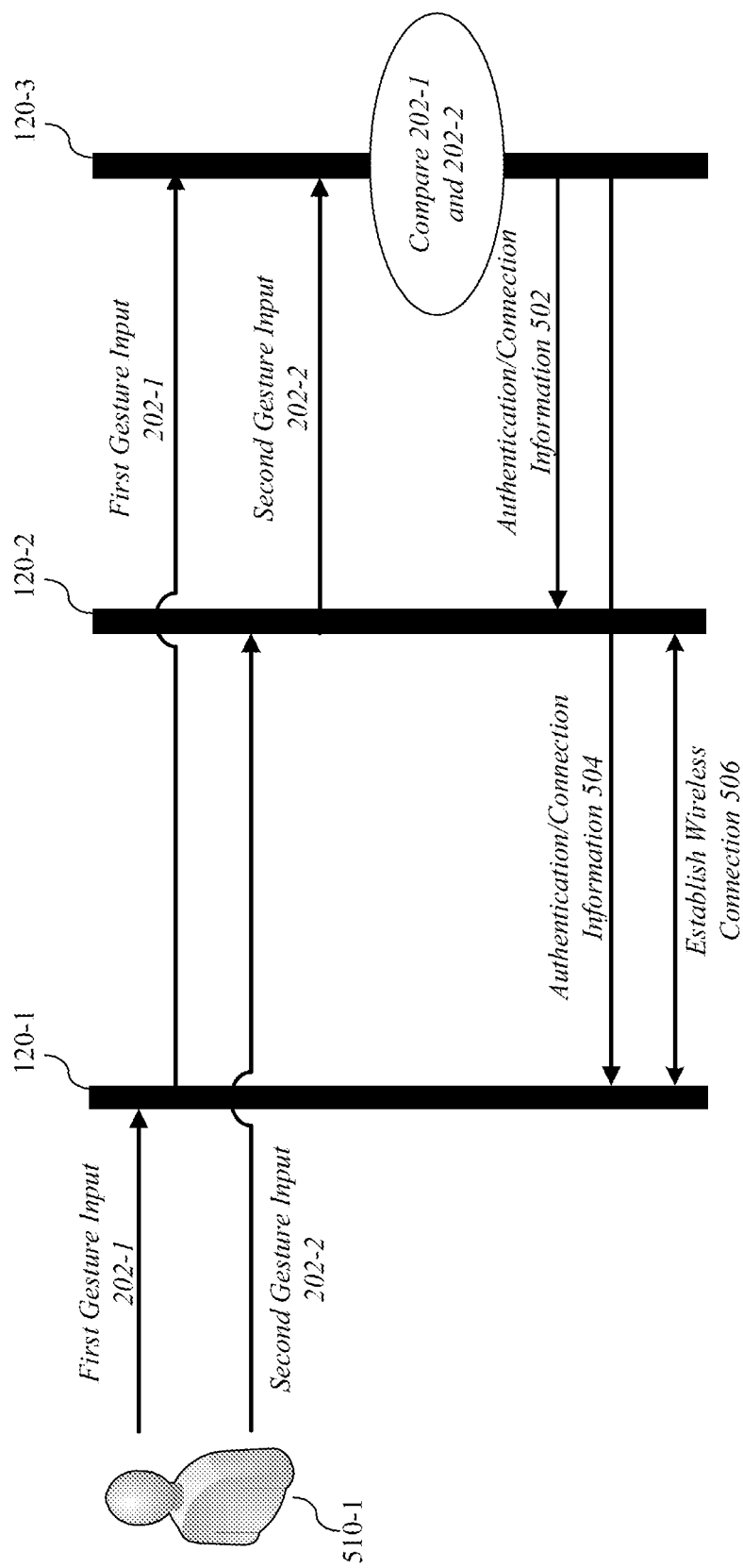
FIG. 5 illustrates an embodiment of a second information flow.

FIG. 5 illustrates an embodiment of an information flow 500. The information flow 500 as shown in FIG. 5 represents an exemplary flow of information between a user 510-1 and electronic devices 120-1, 120-2 and 120-3 as described with respect to the centralized system of FIG. 4. A limited number of information elements are shown in FIG. 5 for purposes of illustration and not limitation. As such, more or less information elements could be used and still fall within the described embodiments.

As shown in FIG. 5, electronic devices 120-1 and 120-2 may be in proximity to one another and may be controlled, owned or otherwise accessible to user 510-1. In some embodiments, a first gesture input 202-1 may be received by electronic device 120-1. For example, user 510-1 may enter the first gesture input 202-1 via a touch interface of electronic device 120-1. In various embodiments, a second gesture input 202-2 may be received by the electronic device 120-2. For example, the user 510-1 may enter the second gesture input 202-2 via a touch interface of the electronic device 120-2.

In some embodiments, each of the electronic devices 120-1 and 120-2 may be operative to provide the received gesture inputs to electronic device 120-3 which may be operative to compare the gesture inputs 202-1 and 202-2 or to compare the gesture inputs 202-1 and 202-2 to a gesture input template if available. If, based on the comparison, the electronic device 120-3 determines that the gesture inputs 202-1 and 202-2 are sufficiently similar (e.g. based on a similarity threshold), the electronic device 120-3 may initiate the establishment of a wireless connection 302 between the electronic devices 120-1 and 120-2 by providing authentication and/or connection information 502/502 to the electronic device 120-1 and 120-2. Based on this information, electronic devices 120-1 and 120-2 may establish a wireless connection 506.

FIG. 6A illustrates one embodiment of a logic flow 600. The logic flow 600 may be representative of some or all of the operations executed by one or more embodiments described herein. For example, the logic flow 600 may illustrate operations performed by the touch gesture recognition system 100 and, more particularly, an electronic device 120-1 of a touch gesture recognition system 100 in a distributed or P2P system.

In the illustrated embodiment shown in FIG. 6A, the logic flow 600 may include receiving a first gesture input at a first electronic device at 602. For example, first gesture input 202-1 may be entered via touch interface 170-1 of electronic device 120-1. In various embodiments, at 604 a second gesture input may be received from a second electronic device in proximity to the first electronic device. For example, second gesture input 202-2 may be entered via touch interface 170-2 of electronic device 120-2 and may be provided to electronic device 120-1 over a shared network connection, a temporary direct connection or via any other suitable means. In other embodiments, as described above, each gesture input 202-1 and 202-2 may be compared to a locally stored gesture input template at the respective receiving electronic device 120-1 or 120-2. The embodiments are not limited in this respect.

In various embodiments, the first gesture input and the second gesture input may be compared at 606. For example, the first gesture input and the second gesture input may be compared and a similarity confidence score may be generated based on the comparison. At 608, in some embodiments, a wireless connection may be initiated or established between the first electronic device and the second electronic device if a similarity of the first gesture input and the second gesture input meets or exceeds a similarity threshold based on the comparing. For example, the connection may be initiated or established if a similarity confidence score meets or exceeds the similarity threshold.

In some embodiments, initiating the gesture recognition/ authorization system may include detecting that the second electronic device is proximate to the first electronic device and initiating gesture recognition based on the detecting. For example, the detecting may comprise one or more of determining that the first and second electronic devices are connected to a same wireless network, using audio signals to determine a distance between the first and second electronic device or using radio frequency signals to determine a distance between the first and second electronic device.

In other embodiments, the gesture recognition/authorization system may include a training phase to assist with the gesture recognition and provide a more personalized experience by allowing for an association of different gesture inputs with different users, different types of connections or different levels of security access, for example, In some embodiments, the gesture recognition training phase may be initiated, a training gesture input may be received, a requested for reentry of the training gesture input may be generated and/or presented, and, responsive to successful reentry of the training gesture input, the training gesture input may be stored as a gesture template.

Figure 6B:
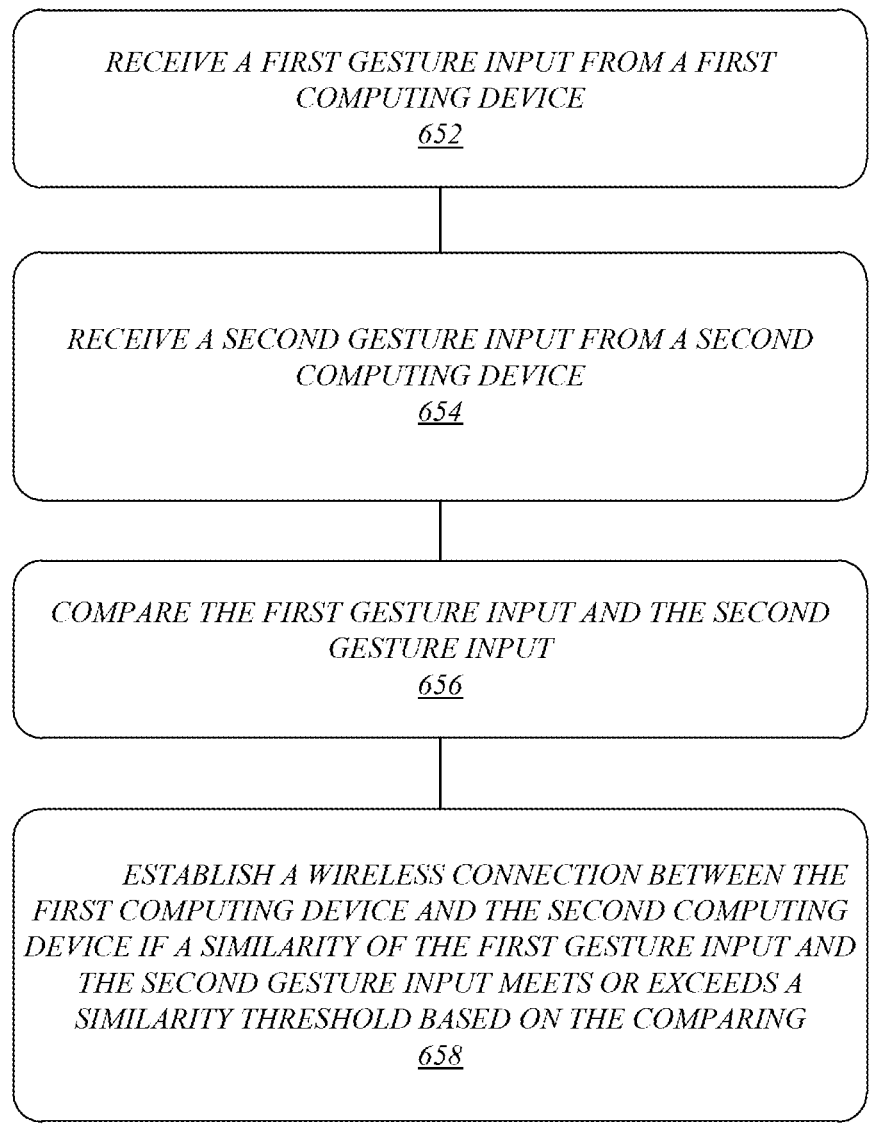
FIG. 6B illustrates an embodiment of a second logic flow.

FIG. 6B illustrates one embodiment of a logic flow 650. The logic flow 650 may be representative of some or all of the operations executed by one or more embodiments described herein. For example, the logic flow 650 may illustrate operations performed by the touch gesture authentication system 400 and, more particularly, an electronic device 120-3 of a touch gesture authentication system 400 as part of a centralized touch gesture authentication system.

In the illustrated embodiment shown in FIG. 6B, the logic flow 600 may comprise receiving a first gesture input from a first electronic device at 652. For example, a first gesture input may be entered via a touch interface of a first electronic device 120-1 and may be provided to a centralized device such as electronic device 120-3. In some embodiments, a second gesture input may be received from a second electronic device at 654. For example, electronic device 120-2 may receive a second gesture input entered via a touch interface and this second gesture input may be provided to electronic device 120-3.

In various embodiments, the first gesture input and the second gesture input may be compared at 656. For example, a similarity confidence score may be generated based on the comparison or a training phase may be initiated whereby a gesture recognition training phase is initiated, a training gesture input may be received from one or more of the first electronic device or the second electronic device, a request for reentry of the training gesture input may be generated or presented, the training gesture input may be reentered, and the training gesture input may be as a gesture template to be used in a comparison with the first gesture input and the second gesture input.

A connection may be initiated or established at 568 if the similarity confidence score meets or exceeds the similarity threshold. For example, a wireless connection may be imitated or established between the first electronic device and the second electronic device if a similarity of the first gesture input and the second gesture input meets or exceeds a similarity threshold or a similarity of the first and second gesture inputs meet or exceeds a similarity threshold based on a comparison with a gesture template. Other embodiments are described and claimed.

Some embodiments described herein may rely on an existing non-secure network connection between electronic devices 120-1 and 120-2 to exchange gesture input information to perform the described gesture recognition analysis. For example, the non-secure connection may transition to a secure connection based on successful authentication using input gesture. Other embodiments may utilize the described gesture input recognition and authentication systems to establish a new network connection. In these embodiments, as described elsewhere herein, the comparison of received gesture inputs to a gesture template may occur locally at each device receiving a gesture input. The embodiments are not limited in this respect.

Figure 7:
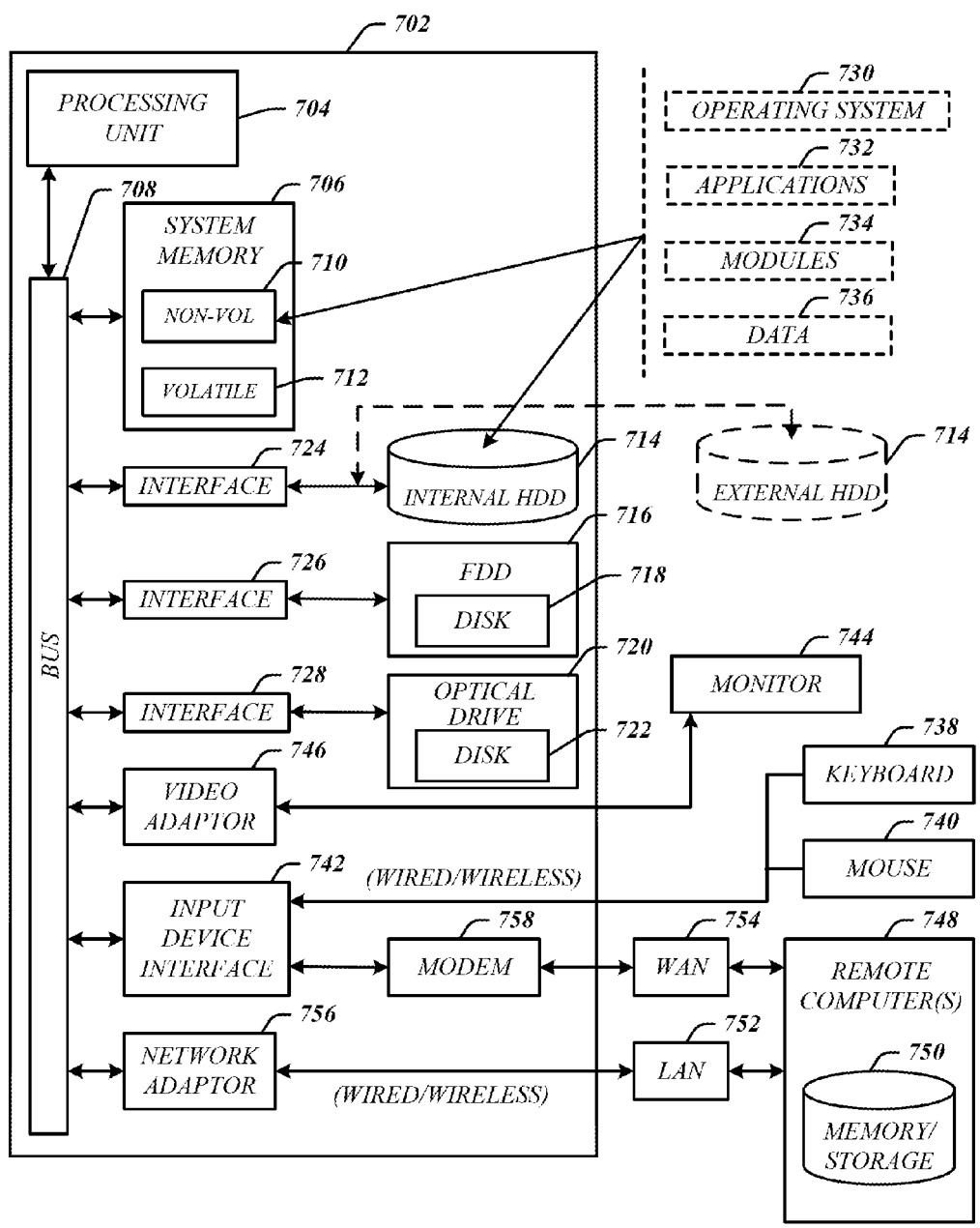
FIG. 7 illustrates an embodiment of a computing architecture.

FIG. 7 illustrates an embodiment of an exemplary computing architecture 700 suitable for implementing various embodiments as previously described. In one embodiment, the computing architecture 700 may comprise or be implemented as part of an electronic device 120-*a*.

As used in this application, the terms "system" and "component" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 comprises a processing unit 704, a system memory 706 and a system bus 708. The processing unit 704 can be any of various commercially available processors, such as those described with reference to the processor 130 shown in FIG. 1.

The system bus 708 provides an interface for system components including, but not limited to, the system memory 706 to the processing unit 704. The system bus 708 can be any of several types of bus structure that may further interconnect to a memory bus (with or without a memory controller), a peripheral bus, and a local bus using any of a variety of commercially available bus architectures. Interface adapters may connect to the system bus 708 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 700 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 706 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 7, the system memory 706 can include non-volatile memory 710 and/or volatile memory 712. A basic input/output system (BIOS) can be stored in the non-volatile memory 710.

The computer 702 may include various types of computer-readable storage media in the form of one or more lower speed memory units, including an internal (or external) hard disk drive (HDD) 714, a magnetic floppy disk drive (FDD) 716 to read from or write to a removable magnetic disk 718, and an optical disk drive 720 to read from or write to a removable optical disk 722 (e.g., a CD-ROM or DVD). The HDD 714, FDD 716 and optical disk drive 720 can be connected to the system bus 708 by a HDD interface 724, an FDD interface 726 and an optical drive interface 728, respectively. The HDD interface 724 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 710, 712, including an operating system 730, one or more application programs 732, other program modules 734, and program data 736. In one embodiment, the one or more application programs 732, other program modules 734, and program data 736 can include, for example, the various applications and/or components of the system 100.

A user can enter commands and information into the computer 702 through one or more wire/wireless input devices, for example, a keyboard 738 and a pointing device, such as a mouse 740. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 704 through an input device interface 742 that is coupled to the system bus 708, but can be connected by other interfaces such as a parallel port, IEEE 1394 serial port, a game port, a USB port, an IR interface, and so forth.

A monitor 744 or other type of display device is also connected to the system bus 708 via an interface, such as a video adaptor 746. The monitor 744 may be internal or external to the computer 702. In addition to the monitor 744, a computer typically includes other peripheral output devices, such as speakers, printers, and so forth.

The computer 702 may operate in a networked environment using logical connections via wire and/or wireless communications to one or more remote computers, such as a remote computer 748. The remote computer 748 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 750 is illustrated. The logical connections depicted include wire/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet.

When used in a LAN networking environment, the computer 702 is connected to the LAN 752 through a wire and/or wireless communication network interface or adaptor 756. The adaptor 756 can facilitate wire and/or wireless communications to the LAN 752, which may also include a wireless access point disposed thereon for communicating with the wireless functionality of the adaptor 756.

When used in a WAN networking environment, the computer 702 can include a modem 758, or is connected to a communications server on the WAN 754, or has other means for establishing communications over the WAN 754, such as by way of the Internet. The modem 758, which can be internal or external and a wire and/or wireless device, connects to the system bus 708 via the input device interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with wire and wireless devices or entities using the IEEE 802 family of standards, such as wireless devices operatively disposed in wireless communication (e.g., IEEE 802.11 over-the-air modulation techniques). This includes at least WiFi (or Wireless Fidelity), WiMax, and Bluetooth™ wireless technologies, among others. Thus, the communication can be a predefined structure as with a conventional network or simply an ad hoc communication between at least two devices. WiFi networks use radio technologies called IEEE 802.11x (a, b, g, n, etc.) to provide secure, reliable, fast wireless connectivity. A WiFi network can be used to connect computers to each other, to the Internet, and to wire networks (which use IEEE 802.3-related media and functions).

The various elements of the touch gesture gesture recognition system 100 as previously described with reference to FIGS. 1-7 may comprise various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The detailed disclosure now turns to providing examples that pertain to further embodiments; examples one through thirty nine (1-39) provided below are intended to be exemplary and non-limiting.

In a first example, a computer-implemented method may comprise receiving a first gesture input at a first electronic device, receiving, at the first electronic device, a second gesture input from a second electronic device in proximity to the first electronic device, comparing the first gesture input and the second gesture input, and establishing a wireless connection between the first electronic device and the second electronic device if a similarity of the first gesture input and the second gesture input meets or exceeds a similarity threshold based on the comparing.

In a second example, a computer-implemented method may comprise the first gesture input entered via a touch interface of the first electronic device and second gesture input entered via a touch interface of the second electronic device.

In a third example, a computer-implemented method may comprise the first and second gesture inputs comprising one or more of a shape, letter, number, or symbol entered using a touch interface.

In a fourth example, a computer-implemented method may comprise detecting that the second electronic device is proximate to the first electronic device, and initiating gesture recognition based on the detecting.

In a fifth example, a computer-implemented method may comprise the detecting comprising one or more of determining that the first and second electronic devices are connected to a same wireless network, using audio signals to determine a distance between the first and second electronic device or using radio frequency signals to determine a distance between the first and second electronic device.

In a sixth example, a computer-implemented method may comprise initiating a gesture recognition training phase, receiving a training gesture input, requesting reentry of the training gesture input, and storing the training gesture input as a gesture template.

In a seventh example, a computer-implemented method may comprise comparing the first gesture input and the second gesture input to the gesture template, generating a similarity confidence score based on the comparison, and establishing the connection if the similarity confidence score meets or exceeds the similarity threshold.

In an eighth example, a computer-implemented method may comprise the wireless connection comprising a secure wireless connection established using a wireless local area network (WLAN).

In a ninth example, a computer-implemented method may comprise associating different gesture inputs with different users, different types of connections or different levels of security access.

A tenth example may include at least one machine-readable storage medium comprising a plurality of instructions that in response to being executed on an electronic device cause the electronic device to carry out a method according to any of the above-recited examples.

An eleventh example may include an apparatus comprising means for performing the method according to any of the above-recited examples.

In a twelfth example, an apparatus may comprise a touch-screen display, a processor coupled to the touch-screen display, and a memory unit coupled to the processor, the memory unit to store a gesture recognition application operative on the processor to receive a first gesture input entered via the touch-screen display, receive a second gesture input entered via a touch-screen display of an electronic device in proximity to the apparatus, compare the first gesture input and the second gesture input, and establish a wireless connection between the apparatus and the electronic device if a similarity of the first gesture input and the second gesture input meets or exceeds a similarity threshold based on the comparing.

In a thirteenth example, the first and second gesture inputs may comprise one or more of a shape, letter, number, or symbol entered using a touch-screen display.

In a fourteenth example, the gesture recognition application may be operative on the processor to detect that the electronic device is proximate to the apparatus.

In a fifteenth example, the detecting may comprise one or more of determining that the apparatus and the electronic device are connected to a same wireless network, using audio signals to determine a distance between the apparatus and the electronic device or using radio frequency signals to determine a distance between the apparatus and the electronic device.

In a sixteenth example, the gesture recognition application may be operative on the processor to initiate a gesture recognition training phase, receive a training gesture input, request reentry of the training gesture input and store the training gesture input as a gesture template in the memory unit.

In a seventeenth example, the gesture recognition application may be operative on the processor to compare the first gesture input and the second gesture input to the gesture template, to calculate a similarity confidence score based on the comparison and to establish the connection if the similarity confidence score meets or exceeds the similarity threshold.

In an eighteenth example, the gesture recognition application may be operative on the processor to associate different gesture inputs with different users, different types of connections or different levels of security access.

In a nineteenth example, a system may comprise an apparatus according to any of the above-recited examples and one or more wireless transceivers coupled to the processor.

In a twentieth example, a computer-implemented method may comprise receiving a first gesture input from a first electronic device, receiving a second gesture input from a second electronic device, comparing the first gesture input and the second gesture input, and establishing a wireless connection between the first electronic device and the second electronic device if a similarity of the first gesture input and the second gesture input meets or exceeds a similarity threshold based on the comparing.

In a twenty first example, a computer-implemented method may comprise the first gesture input entered via a touch interface of the first electronic device and second gesture input entered via a touch interface of the second electronic device, the first and second gesture inputs comprising one or more of a shape, letter, number, or symbol entered using a touch interface.

In a twenty second example, a computer-implemented method may comprise determining that the first electronic device is proximate to the second electronic device by determining that the first and second electronic devices are connected to a same wireless network, using audio signals to determine a distance between the first and second electronic devices or using radio frequency signals to determine a distance between the first and second electronic devices, and initiating gesture recognition based on the determining.

In a twenty third example, a computer-implemented method may comprise initiating a gesture recognition training phase, receiving a training gesture input from one or more of the first electronic device or the second electronic device, requesting reentry of the training gesture input, and storing the training gesture input as a gesture template.

In a twenty fourth example, a computer-implemented method may comprise comparing the first gesture input and the second gesture input to the gesture template, generating a similarity confidence score based on the comparison, and establishing the connection if the similarity confidence score meets or exceeds the similarity threshold.

In a twenty fifth example, a computer-implemented method may comprise associating different gesture inputs with different users, different electronic devices, different types of connections or different levels of security access.

A twenty sixth example may comprise at least one machine-readable storage medium comprising a plurality of instructions that in response to being executed on an electronic device cause the electronic device to carry out a method according to any of the above-recited examples.

A twenty seventh example may comprise an apparatus comprising means for performing the method according to any of the above-recited examples.

In a twenty eighth example, an apparatus may comprise one or more wireless transceivers, a processor coupled to the one or more wireless transceivers, and a memory unit coupled to the processor, the memory unit to store a gesture recognition application operative on the processor to receive a first gesture input from a first electronic device, receive a second gesture input from a second electronic device, compare the first gesture input and the second gesture input, and establishing a wireless connection between the first electronic device and the second electronic device if a similarity of the first gesture input and the second gesture input meets or exceeds a similarity threshold based on the comparing.

In a twenty ninth example, an apparatus may comprise the first gesture input entered via a touch interface of the first electronic device and second gesture input entered via a touch interface of the second electronic device, the first and second gesture inputs comprising one or more of a shape, letter, number, or symbol entered using a touch interface.

In a thirtieth example, an apparatus may comprise the gesture recognition application operative on the processor to determine that the first electronic device is proximate to the second electronic device by determining that the first and second electronic devices are connected to a same wireless network, using audio signals to determine a distance between the first and second electronic devices or using radio frequency signals to determine a distance between the first and second electronic devices and to initiate gesture recognition based on the determining.

In a thirty first example, an apparatus may comprise the gesture recognition application operative on the processor to initiate a gesture recognition training phase, receive a training gesture input from one or more of the first electronic device or the second electronic device, request reentry of the training gesture input, and store the training gesture input as a gesture template.

In a thirty second example, an apparatus may comprise the gesture recognition application operative on the processor to compare the first gesture input and the second gesture input to the gesture template, generate a similarity confidence score based on the comparison, and establish the connection if the similarity confidence score meets or exceeds the similarity threshold.

In a thirty third example, an apparatus may comprise the gesture recognition application operative on the processor to associate different gesture inputs with different users, different electronic devices, different types of connections or different levels of security access.

In a thirty fourth example, a system may comprise a first electronic device operative to receive a first gesture input via a touch interface of the first electronic device; a second electronic device operative to receive a second gesture input via a touch interface of the second electronic device; and a third electronic device operative to receive the first gesture input from the first electronic device and the second gesture input from the second electronic device, to compare the first gesture input and the second gesture input, and to establish a wireless connection between the first electronic device and the second electronic device if a similarity of the first gesture input and the second gesture input meets or exceeds a similarity threshold based on the comparing.

In a thirty fifth example, the third electronic device may comprise a server device.

In a thirty sixth example, the third electronic device may be operative to store, in a memory unit, one or more gesture templates and to compare one or more of the first and second gesture inputs to the gesture templates.

In a thirty seventh example, the third electronic device may be operative to store, in a memory unit, one or more sets of gesture inputs, each set comprising two or more different gestures that are linked or paired together.

In a thirty eighth example, the third electronic device may be operative to establish a wireless connection between the first electronic device and the second electronic device if the first gesture input and the second gesture input comprise different gestures that match a set of gesture inputs.

In a thirty ninth example, the first and second gesture inputs may comprise one or more of a shape, letter, number, or symbol.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A computer-implemented method, comprising:
receiving a first gesture input from a first electronic device;
receiving a second gesture input from a second electronic device;
comparing at a third electronic device a shape of the entire first gesture input and a shape of the entire second gesture input to a shape of each gesture template of multiple gesture templates; and
transmitting connection information to the first and second electronic devices to enable establishing a wireless connection between the first electronic device and the second electronic device with a selected level of security access permissions between the first and second electronic devices if a similarity of the shape of the entire first gesture input and the shape of a first gesture template of the multiple gesture templates meets or exceeds a similarity threshold based on the comparing, and if the shape of the entire second gesture input and the shape of a second gesture template of the multiple gesture templates meets or exceeds a similarity threshold based on the comparing, the selected level of security access permissions based on which gesture templates of the multiple gesture templates comprise the first and second gesture templates.

2. The computer-implemented method of claim 1, the first and second gesture inputs comprising one or more of a letter, number, or symbol entered using a touch interface.

3. The computer-implemented method of claim 1, the wireless connection comprising a secure wireless connection established using a wireless local area network (WLAN).

4. The computer-implemented method of claim 1, the first gesture input entered via a touch interface of the first electronic device and second gesture input entered via a touch interface of the second electronic device, the first and second gesture inputs comprising one or more of a letter, number, or symbol entered using a touch interface.

5. The computer-implemented method of claim 1, comprising:
   determining that the first electronic device is proximate to the second electronic device by determining that the first and second electronic devices are connected to a same wireless network, using audio signals to determine a distance between the first and second electronic devices or using radio frequency signals to determine a distance between the first and second electronic devices; and
   initiating gesture recognition based on the determining.

6. The computer-implemented method of claim 1, comprising:
   initiating a gesture recognition training phase;
   receiving a training gesture input from one or more of the first electronic device or the second electronic device;
   requesting reentry of the training gesture input; and
   storing the training gesture input as a gesture template of the multiple gesture templates.

7. The computer-implemented method of claim 1, comprising:
   associating different gesture inputs with different users, different electronic devices, different types of connections or different levels of security access.

8. An apparatus, comprising:
   one or more wireless transceivers;
   a processor coupled to the one or more wireless transceivers; and
   a memory unit coupled to the processor, the memory unit to store a gesture recognition application operative on the processor to
   receive at the one or more wireless transceivers a first gesture input from a first electronic device,
   receive at the one or more wireless transceivers a second gesture input from a second electronic device,
   compare a shape of the entire first gesture input and a shape of the entire second gesture input to a shape of each gesture template of multiple gesture templates, and
   transmit connection information to the first and second electronic devices to enable establishment of a wireless connection between the first electronic device and the second electronic device with a selected level of security access permissions between the first and second electronic devices if a similarity of the shape of the entire first gesture input and the shape of a first gesture template of the multiple gesture templates meets or exceeds a similarity threshold based on the comparing, and if the shape of the entire second gesture input and the shape of a second gesture template of the multiple gesture templates meets or exceeds a similarity threshold based on the comparing, the selected level of security access permissions based on which gesture templates of the multiple gesture templates comprise the first and second gesture templates.

9. The apparatus of claim 8, the first gesture input entered via a touch interface of the first electronic device and second gesture input entered via a touch interface of the second electronic device, the first and second gesture inputs comprising one or more of a letter, number, or symbol entered using a touch interface.

10. The apparatus of claim 8, the gesture recognition application operative on the processor to determine that the first electronic device is proximate to the second electronic device by determining that the first and second electronic devices are connected to a same wireless network, using audio signals to determine a distance between the first and second electronic devices or using radio frequency signals to determine a distance between the first and second electronic devices and to initiate gesture recognition based on the determining.

11. The apparatus of claim 8, the gesture recognition application operative on the processor to initiate a gesture recognition training phase, receive a training gesture input from one or more of the first electronic device or the second electronic device, request reentry of the training gesture input, and store the training gesture input as a gesture template of the multiple gesture templates.

12. The apparatus of claim 8, the gesture recognition application operative on the processor to associate different gesture inputs with different users, different electronic devices, different types of connections or different levels of security access.

13. A system, comprising:
   a first electronic device operative to receive a first gesture input via a touch interface of the first electronic device;
   a second electronic device operative to receive a second gesture input via a touch interface of the second electronic device; and
   a third electronic device operative
      to receive the first gesture input from the first electronic device and the second gesture input from the second electronic device,
      to compare a shape of the entire first gesture input and a shape of the entire second gesture input to a shape of each gesture template of multiple gesture templates, and
      to transmit connection information to the first and second electronic devices to enable establishment of a wireless connection between the first electronic device and the second electronic device with a selected level of security access permissions between the first and second electronic devices if a similarity of the shape of the entire first gesture input and the shape of a first gesture template of the multiple gesture templates meets or exceeds a similarity threshold based on the comparing, and if the shape of the entire second gesture input and the shape of a second gesture template of the multiple gesture templates meets or exceeds a similarity threshold based on the comparing, the selected level of security access permissions based on which gesture templates of the multiple gesture templates comprise the first and second gesture templates.

14. The system of claim 13, the third electronic device comprising a server device.

15. The system of claim 13, the third electronic device operative to store, in a memory unit, one or more sets of gesture inputs as gesture templates of the multiple gesture templates, each set comprising two or more different gestures that are linked or paired together.

16. The system of claim 15, the third electronic device operative to establish a wireless connection between the first electronic device and the second electronic device if the shape of the entire first gesture input and the shape of the entire second gesture input comprise different gestures that match shapes of entire gesture inputs of a set of gesture inputs stored as the first and second gesture templates of the multiple gesture templates.

17. The system of claim 13, the first and second gesture inputs comprising one or more of a letter, number, or symbol.

* * * * *